US011866053B2

(12) United States Patent
Laruelo et al.

(10) Patent No.: US 11,866,053 B2
(45) Date of Patent: Jan. 9, 2024

(54) METHOD AND DEVICE FOR PREDICTING A CUSTOMIZED COEFFICIENT OF FRICTION FOR A VEHICLE ON A SECTION OF ROAD

(71) Applicant: Continental Automotive GmbH, Hannover (DE)

(72) Inventors: Andrea Laruelo, Toulouse (FR); Holger Karn, Toulouse (FR); Anaïs Goursolle, Toulouse (FR)

(73) Assignee: Continental Automotive GmbH

( * ) Notice: Subject to any disclaimer, the term of this patent is extended or adjusted under 35 U.S.C. 154(b) by 63 days.

(21) Appl. No.: 17/613,745

(22) PCT Filed: Jun. 4, 2020

(86) PCT No.: PCT/EP2020/065515
§ 371 (c)(1),
(2) Date: Nov. 23, 2021

(87) PCT Pub. No.: WO2020/254123
PCT Pub. Date: Dec. 24, 2020

(65) Prior Publication Data
US 2022/0234590 A1    Jul. 28, 2022

(30) Foreign Application Priority Data

Jun. 18, 2019 (FR) ...................................... 1906507

(51) Int. Cl.
*B60W 40/068* (2012.01)
*B60W 50/00* (2006.01)
(Continued)

(52) U.S. Cl.
CPC ...... *B60W 40/068* (2013.01); *B60W 50/0097* (2013.01); *G06N 5/022* (2013.01);
(Continued)

(58) Field of Classification Search
CPC .......... B60W 40/068; B60W 50/0097; B60W 2552/40; B60W 2556/45; B60W 2555/20;
(Continued)

(56) References Cited

U.S. PATENT DOCUMENTS

| 11,453,400 B2* | 9/2022 | Piriou ................. B60T 8/17636 |
| 2018/0037234 A1 | 2/2018 | Hoedt et al. |

(Continued)

FOREIGN PATENT DOCUMENTS

| DE | 102017222568 A1 | 6/2019 |
| EP | 2161144 A2 | 3/2010 |

(Continued)

OTHER PUBLICATIONS

Reiter et al., "Automated Automotive Tire Inflation System—Effect of Tire Pressure on Vehicle Handling", 6th IFAC Symposium Advances in Automotive Control, Jul. 12-14, 2010, pp. 638-643.

(Continued)

*Primary Examiner* — Peter D Nolan
*Assistant Examiner* — Wae L Louie
(74) *Attorney, Agent, or Firm* — RatnerPrestia

(57) ABSTRACT

A method for predicting, for a motor vehicle traveling on a first road segment, a future coefficient of friction of the vehicle on a second road segment. The method includes steps of obtaining operating parameters of the vehicle and at least one characteristic of the first road segment, of computing an indicator on the basis of the obtained operating parameters of the vehicle, of determining a frictional category of the vehicle according to the value of the computed indicator and of the at least one obtained characteristic of the road segment, of selecting a friction profile of the vehicle on the basis of the determined frictional category, and of determining a coefficient of friction of the vehicle by applying the selected profile to at least one characteristic of the (Continued)

second road segment. A device for implementing the prediction method is also disclosed.

11 Claims, 4 Drawing Sheets

(51) Int. Cl.
*G06N 5/022* (2023.01)
*G07C 5/00* (2006.01)

(52) U.S. Cl.
CPC ....... *G07C 5/008* (2013.01); *B60W 2510/182* (2013.01); *B60W 2520/10* (2013.01); *B60W 2520/105* (2013.01); *B60W 2520/125* (2013.01); *B60W 2520/28* (2013.01); *B60W 2520/30* (2013.01); *B60W 2540/12* (2013.01); *B60W 2552/40* (2020.02); *B60W 2555/20* (2020.02); *B60W 2556/45* (2020.02)

(58) Field of Classification Search
CPC ....... B60W 2510/182; B60W 2520/10; B60W 2520/105; B60W 2520/125; B60W 2520/28; B60W 2520/30; B60W 2540/12; G06N 5/022; G07C 5/008
See application file for complete search history.

(56) References Cited

U.S. PATENT DOCUMENTS

| | | | |
|---|---|---|---|
| 2018/0111623 A1* | 4/2018 | Augst | B60W 40/06 |
| 2018/0244278 A1 | 8/2018 | Shami et al. | |
| 2019/0047575 A1* | 2/2019 | Lellmann | G08G 1/096775 |
| 2019/0242809 A1* | 8/2019 | Brown | F16M 13/022 |
| 2020/0114912 A1* | 4/2020 | MacInnes | B60W 30/12 |
| 2020/0216085 A1* | 7/2020 | Bobier-Tiu | B60W 40/08 |
| 2020/0339130 A1* | 10/2020 | Piriou | B60T 8/17636 |
| 2022/0234590 A1* | 7/2022 | Laruelo | B60W 40/068 |
| 2022/0388516 A1* | 12/2022 | Laruelo | G08G 1/0112 |

FOREIGN PATENT DOCUMENTS

| | | |
|---|---|---|
| EP | 2955078 A1 | 12/2015 |
| EP | 2876413 B1 | 4/2018 |

OTHER PUBLICATIONS

Parczewski, "Effect of Trye Inflation Preassure on the Vehicles Dynamics During Braking Manouvre", Maintenance and Reliability, 2013, vol. 15, No. 2, pp. 134-139.

Bharat et al., "Influence of Tire Operating Conditions on ABS Performance", Tire Science and Technology, TSTCA, 2015, vol. 43, No. 3, pp. 216-241.

Andrieux et al., "New Results on the Relation Between Tyre-Road Longitudinal Stiffness and Maximum Available Grip for Motor Car", Vehicle System Dynamics, Dec. 2020, vol. 48, No. 12, pp. 1511-1533.

Falk et al., "Tire Simulations Using a Slip Velocity, Pressure and Temperature Dependent Friction Law", Institut Für Statik und Dynamik der Tragwerke (ISD), Technische Universität Dresden, 2015, 11 pages.

Schmeitz et al., "Extending the Magic Formula and SWIFT Tyre Models for Inflation Pressure Changes", Researchgate 2005, 26 pages.

Pacejka et al., "Tire and Vehicle Dynamics", Third Edition, Elsevier, 2005, 7 pages.

International Search Report and Written Opinion for International Application No. PCT/EP2020/065515, dated Nov. 11, 2020, 8 pages.

International Search Report and Written Opinion for International Application No. PCT/EP2020/065515, dated Nov. 11, 2020, 12 pages (French).

\* cited by examiner

METHOD AND DEVICE FOR PREDICTING A CUSTOMIZED COEFFICIENT OF FRICTION FOR A VEHICLE ON A SECTION OF ROAD

CROSS REFERENCE TO RELATED APPLICATIONS

This application is the U.S. National Phase Application of PCT International Application No. PCT/EP2020/065515, filed Jun. 4, 2020, which claims priority to French Patent Application No. 1906507, filed Jun. 18, 2019, the contents of such applications being incorporated by reference herein.

FIELD OF THE INVENTION

The invention generally relates to the assessment of contact characteristics of a vehicle with the roadway. It particularly relates to the prediction of a coefficient of friction of a particular vehicle on a particular road segment.

BACKGROUND OF THE INVENTION

Tires are the only contact elements between a vehicle and the roadway, and consequently represent a major factor in the dynamic behavior and safety of a vehicle. In particular, the friction characteristics between a vehicle and the roadway are data that are key to estimating the dynamic behavior of a vehicle. Knowing the frictional behavior of a vehicle is particularly useful for improving the effectiveness of devices such as ABS (Anti-lock Braking System), ESP (Electronic Stability Program), or even TCS (Traction Control System).

The frictional behavior of a vehicle on a particular road segment is influenced by the characteristics of the vehicle, in particular of the tires fitted thereto, by the meteorological conditions and by the characteristics of the roadway on the considered road segment.

Due to the relevance of this parameter, initiatives exist for constructing friction maps per road segment. Thus, a connected vehicle can obtain a frictional characteristic of the road segment on which it travels. However, the frictional behavior of a vehicle does not solely result from the characteristics of the roadway, but it also depends on characteristics of the vehicle, such as the type of tires fitted thereto, their state of wear or their inflation pressure. Thus, on a given road segment, various vehicles will not benefit from the same adhesion conditions. Therefore, a requirement exists for determining the frictional behavior of a particular vehicle on a road segment.

EP 2876413 B1, incorporated herein by reference, discloses a method for comparing the frictional behavior of various vehicles. According to this method, vehicles that are spatially close to one another transmit tire-road friction values to a server. The method takes advantage of the fact that vehicles that are close to one another benefit from the same road conditions. Thus, the observed differences in friction values are attributable to the characteristics of these vehicles. However, the method of EP 2876413 B1 requires that all the vehicles for which the frictional behavior is to be mutually compared implement an algorithm for determining friction. However, these algorithms are particularly complex and require additional sensors.

Document US 2018/0244278 A1, incorporated herein by reference, discloses a method for estimating a coefficient of friction on the basis of lateral accelerations and of skidding angles measured on curved trajectories. This technique does not allow a coefficient of friction to be estimated on a straight trajectory.

For this reason, a solution is required that allows the frictional behavior of a particular vehicle to be estimated without having to equip said vehicle with specific sensors or for it to implement a complex friction computation algorithm.

SUMMARY OF THE INVENTION

To this end, a method is proposed for predicting, for a motor vehicle traveling on a first road segment, a future coefficient of friction of the vehicle on a second road segment. The method is characterized in that it comprises the following steps:
  obtaining operating parameters of the vehicle and at least one characteristic of the first road segment;
  computing an indicator on the basis of the obtained operating parameters of the vehicle;
  determining a frictional category of the vehicle according to the value of the computed indicator and of the at least one obtained characteristic of the road segment;
  selecting a friction profile of the vehicle on the basis of the determined frictional category;
  determining a coefficient of friction of the vehicle by applying the selected profile to at least one characteristic of the second road segment.

Thus, the method proposes selecting a vehicle profile on the basis of its frictional behavior that is determined by virtue of characteristic operating parameters acquired as it travels on a first road segment, the characteristics of which are known, then determining the frictional behavior of this vehicle on a second road segment, by applying the determined profile.

Within the meaning of an aspect of the invention, the frictional category of a vehicle corresponds to a range of friction values, within which the coefficient of friction (or potential of friction) of the vehicle is located, for a characteristic of the road segment. A frictional category according to an aspect of the invention is defined so that vehicles belonging to the same frictional category have a relatively close coefficient of friction for given road conditions.

It also should be noted that the terms "coefficient of friction of a vehicle", or "potential of friction", in this case correspond to the coefficient of friction of the tires of the vehicle on the roadway on which it travels.

The frictional category of the vehicle for a segment on which it travels is determined on the basis of operating parameters of the vehicle and of a characteristic of the road segment. Thus, the method does not need the vehicle to be equipped with means for estimating friction. The method thus can be applied to a large fleet of vehicles.

Within the meaning of an aspect of the invention, a friction profile, or frictional profile, of a vehicle defines the frictional behavior of a vehicle as a function of at least one characteristic of a road segment. By knowing the frictional behavior of a vehicle on a particular segment, it is possible to determine its profile and, on the basis of the profile, it is possible to determine the frictional behavior of the vehicle on another road segment, without having operating parameters of the vehicle on this second road segment.

Finally, on the basis of the frictional category determined for the vehicle on the second road segment, a coefficient of friction of the vehicle is determined on the second segment.

The method thus allows a customized coefficient of friction to be predicted for a vehicle on a future road segment, without needing to adapt the vehicle to carry out friction measurements or estimates. Contrary to the prior art, the coefficient of friction is known before the vehicle enters the considered segment. Thus, the configuration of safety devices, such as ABS or ESP, can be carried out in advance. This improves safety.

According to a particular embodiment, the at least one characteristic of the first and second road segments comprises, for a considered segment:
  a surface characteristic of the roadway; and
  a surface weather characteristic.

The friction conditions of a vehicle on a particular road segment depend on characteristics specific to the vehicle, but also on the type of surface of the road segment and on the surface weather of the road segment. Thus, the method proposes determining a frictional category of a vehicle on a road segment according to the value of an indicator computed on the basis of at least one operating parameter of the vehicle, of a surface characteristic of the roadway and of a surface weather characteristic of this road segment.

According to a particular embodiment, the indicator is computed on the basis of at least one operating parameter of the vehicle selected from among the following parameters:
  speed of rotation of the driving wheels;
  speed of rotation of the free wheels;
  longitudinal acceleration;
  transverse acceleration;
  speed of the vehicle;
  torque of the driving wheels;
  pressure in the brake master cylinder;
  depression of the brake pedal.

Such parameters are available on most vehicles, for example, through signals conveyed over a CAN bus. Moreover, these indicators allow the dynamic behavior of a vehicle to be characterized, and allow correlations to be established with the friction of the tires on the roadway. For example, a difference in rotation speed between driving wheels and free wheels, a particular longitudinal acceleration or even a particular pressure in the braking system can be linked to a particular frictional category of a vehicle.

Thus, it is possible to compute an indicator on the basis of these parameters without requiring particular adaptation on a vehicle and this allows correlations to be established with a frictional category of the vehicle.

In a particular embodiment, the profile is selected from a set of frictional profiles, with the set being determined according to the following steps:
  collecting, for a plurality of collection instants, training vehicle data, with a training vehicle data item comprising at least, for a given instant:
  a road surface characteristic;
  a surface weather characteristic; and
  a coefficient of friction estimated by the vehicle;
  determining a plurality of frictional categories of vehicles by unsupervised classification of the collected data, so that a particular frictional category comprises vehicles with a coefficient of friction within the same range of values for a given surface characteristic and weather characteristic;
  determining at least one vehicle friction profile, with a friction profile being defined by a set of frictional categories to which a particular vehicle is assigned.

A fleet of training vehicles collects data by traveling on a road network. Each collected data item comprises at least one characteristic of the road surface on which the vehicle travels, a weather characteristic on the surface of the roadway and an estimate of a coefficient of friction. To this end, the training vehicles are equipped with particular sensors, or implement a specific algorithm allowing them to determine a coefficient of friction.

The data collected thus are partitioned into clusters by an unsupervised classification algorithm. In this way, the vehicles are grouped according to their frictional behavior into particular surface and weather conditions. Categories of vehicles, called frictional categories, are thus obtained according to the friction values observed in various road conditions. For example, a particular frictional category can comprise vehicles with a coefficient of friction that is within a particular range of values when they travel on a wet highway type lane. Thus, for a given type of surface and weather, several frictional categories can be obtained.

The frictional profiles of vehicles are then defined by the set of frictional categories to which a vehicle belongs.

Thus, by knowing the profile of a vehicle, the frictional category to which this vehicle belongs can be predicted in particular surface and weather conditions.

According to a particular embodiment, the method is such that selecting a profile comprises:
  a phase of training a supervised learning model comprising the following steps:
  creating, for a data item collected by a training vehicle at a collection instant, a characteristic vector comprising at least:
    an indicator computed on the basis of at least one operating parameter of the training vehicle collected at the collection instant;
    the road surface characteristic; and
    the surface weather characteristic;
  training a learning model on the basis of the characteristic vector associated with the frictional category of the vehicle determined for the collected data;
  a prediction phase, during which:
  a frictional category of a vehicle traveling on the first segment is protected by applying the learning model to:
    an indicator computed on the basis of at least one operating parameter of the vehicle on the first segment;
    the road surface characteristic of the first segment; and
    the surface weather characteristic of the first segment;
  a friction profile is selected at least on the basis of the category predicted for the vehicle on the first segment.

A learning model is trained on the basis of the data collected from the fleet of training vehicles. In particular, the model is trained with an indicator computed on the basis of at least one operating parameter of the training vehicle collected at the collection instant, of a road surface characteristic and of a weather characteristic. The indicator is computed on the basis of parameters such as those that have been previously described.

The target for the supervised learning is the group determined for the vehicle for the surface and weather conditions. Such an arrangement allows a learning model to be trained to predict a frictional category of a vehicle, on the basis of operating parameters of the vehicle acquired as it travels on a particular road surface and in particular weather conditions.

Thus, the trained model can be applied to operating parameters of a vehicle acquired as it travels on a particular surface and in particular weather conditions for determining a frictional category of the vehicle. The category that is thus obtained allows a friction profile to be established for the vehicle.

According to a particular embodiment, the friction profile is determined on the basis of at least two frictional categories of the vehicle determined for at least two first road segments.

Frictional categories to which the vehicle belongs are determined on several road segments on the basis of operating parameters, of the type of surface and of weather obtained as the vehicle travels on these road segments. Knowing several frictional categories of the vehicle allows any ambiguities to be removed when selecting a profile for the vehicle. The selection of a friction profile of a vehicle is then carried out more reliably.

According to another aspect, the invention relates to a device for predicting, for a motor vehicle traveling on a first road segment, a future coefficient of friction of the vehicle on a second road segment, the device comprising:
- a communication module adapted to obtain operating parameters of the vehicle and at least one characteristic of the first road segment;
- a computer adapted to compute an indicator on the basis of the obtained operating parameters of the vehicle;
- a module for determining a frictional category of the vehicle according to the value of the computed indicator and of the at least one obtained characteristic of the road segment;
- a module for selecting a friction profile of the vehicle on the basis of the determined frictional category; and
- a module for determining a coefficient of friction of the vehicle by applying the selected profile to at least one characteristic of the second road segment.

According to yet another aspect, the invention relates to a digital road map, in which at least one road segment is associated with a customized coefficient of friction for a vehicle, the customized coefficient of friction being determined by a prediction method as previously described.

An aspect of the invention also relates to a road vehicle comprising a communication unit adapted to receive, from a server, a customized digital road map as described above, and a computation unit adapted to configure an item of safety equipment of the vehicle according to the value of a customized coefficient of friction associated with a particular road segment, when the vehicle travels on said road segment.

According to yet another aspect, the invention relates to a data medium containing computer program instructions configured to implement the steps of a prediction method as described above when the instructions are executed by a processor.

The data medium can be a non-transitory data medium such as a hard disk, a flash memory or an optical disk, for example.

The data medium can be any entity or device capable of storing instructions. For example, the medium can comprise a storage means, such as a ROM, RAM, PROM, EPROM, a CD ROM or even a magnetic recording means, for example, a hard disk.

Furthermore, the data medium can be a transmissible medium such as an electrical or optical signal, which can be routed via an electrical or optical cable, by radio or by other means.

Alternatively, the data medium can be an integrated circuit, in which the program is incorporated, the circuit being adapted to execute or to be used in the execution of the method in question.

The various aforementioned embodiments or implementation characteristics can be added, independently or in combination with one another, to the steps of the prediction method.

The vehicles, maps, devices, and data media have at least similar advantages to those conferred by the method to which they refer.

BRIEF DESCRIPTION OF THE DRAWINGS

Further features, details and advantages of aspects of the invention will become apparent upon reading the following detailed description and upon analyzing the appended drawings, in which.

DETAILED DESCRIPTION OF AN EMBODIMENT

Figure 1:
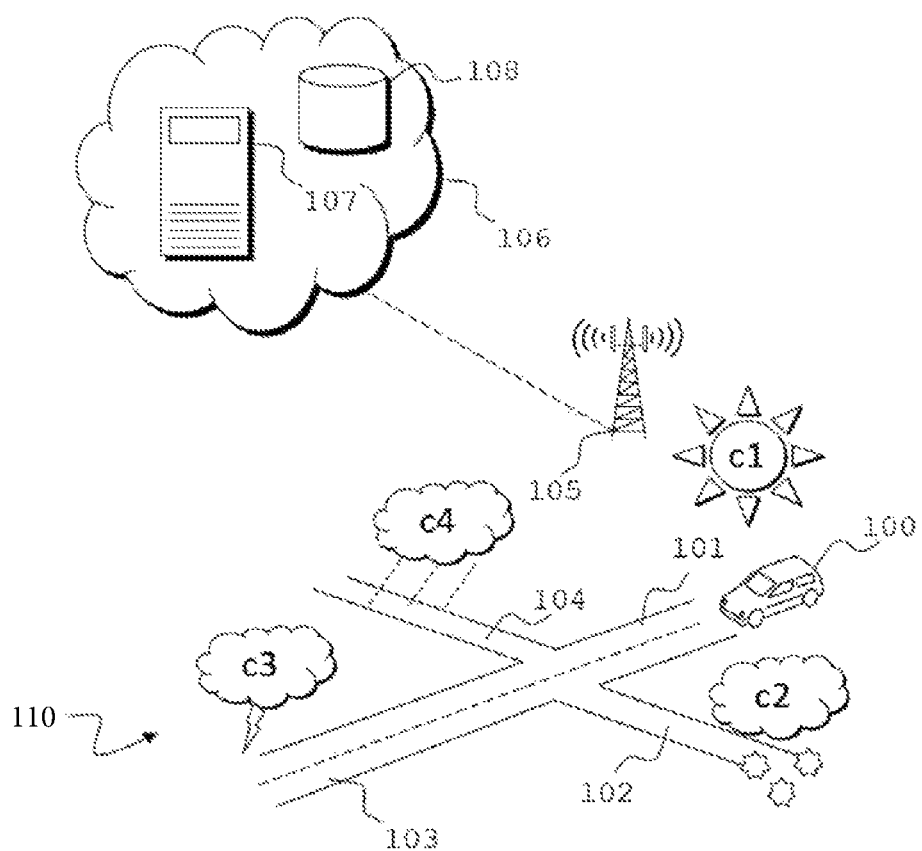
FIG. 1 shows an environment adapted to implement the invention according to a particular embodiment.

The environment of FIG. 1 comprises a road network 100 comprising 4 road segments 101, 102, 103 and 104.

FIG. 1 also shows a road vehicle 100, for example, a passenger vehicle, traveling on a first segment 101 of the road network 110. The segments 101, 102, 103 and 104 respectively benefit from road conditions C1, C2, C3 and C4. Such road conditions are particularly dependent on a surface weather characteristic (wet roadway, ice, snow, dry road, etc.) and/or a characteristic of the surface of the roadway or of a type of road.

The vehicle 100 is a connected vehicle adapted to exchange messages with a server 107 of a communication network 106. To this end, the vehicle particularly comprises a communication interface adapted to establish communications through a cellular access network 105, for example, an access network of the 3G, 4G or 5G type, or even a Wi-Fi or Wi-Max network. The vehicle 100 further comprises sensors allowing signals to be acquired that relate to its operation, as well as an electronic control unit (ECU) allowing the signals originating from these sensors to be processed, and particularly to be encoded, and allowing at least some of these signals to be transmitted to the server 107 in accordance with a suitable communication protocol.

The server 107 is a data processing server comprising a memory and a processing unit, for example, a processor. The processor is configured by computer program instructions stored in the memory for implementing the steps of a method for predicting a coefficient of friction according to a particular embodiment of the invention. The server 107 also comprises a communication interface allowing it to exchange messages with vehicles, and particularly with the vehicle 100.

Figure 2:
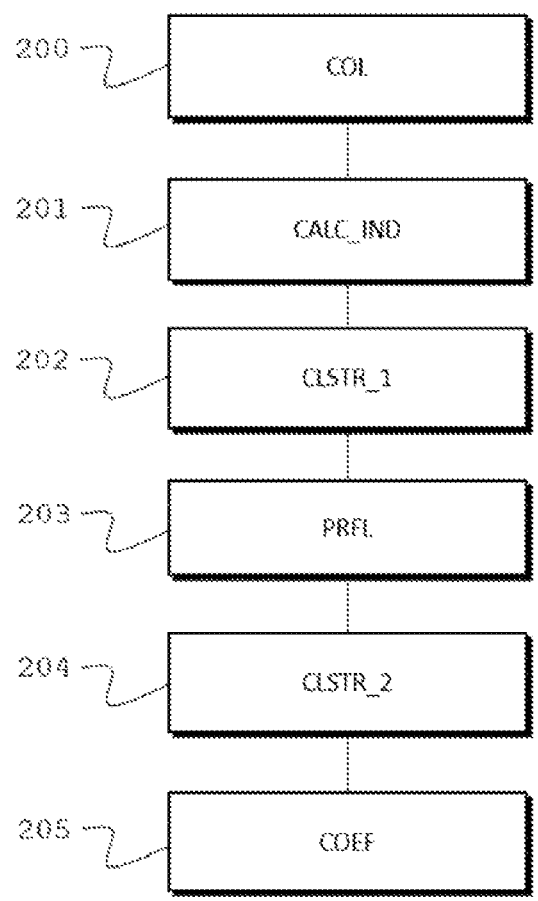
FIG. 2 shows the main steps of the prediction method according to a particular embodiment.

A particular embodiment of the prediction method will now be described with reference to FIG. 2.

During a first step 200, the server 107 obtains operating parameters of the vehicle 100 and at least one characteristic of the road segment 101 on which the vehicle 100 travels.

The operating parameters are obtained, for example, by the vehicle 100 from suitable sensors, such as, for example, wheel rotation speed sensors, or pressure sensors in a braking system of the vehicle, and are transmitted to the server 107 in a suitable message by means of the access network 105 and of the communication network 106.

In a particular embodiment, the operating parameters of the vehicle 100 received by the server 107 correspond to one or more parameters selected from the following parameters:
  speed of the driving wheels;
  speed of the free wheels;
  longitudinal acceleration;
  transverse acceleration;
  speed of the vehicle;
  torque of the driving wheels;
  pressure in the brake master cylinder;
  depression of the brake pedal;
  etc.

The server 107 obtains at least one characteristic of the road segment 101 on which the vehicle 100 travels on the basis of a geographical position transmitted by the vehicle. The obtained characteristics of the road segment can comprise, in a particular embodiment, a surface characteristic of the roadway of the segment 101 and/or a surface weather characteristic of the road segment 101 when the vehicle travels on this segment.

The surface characteristic corresponds, for example, to the nature of the roadway (asphalt, concrete, chippings, etc.), to its wear or to its age, or even to the type of lane (expressway, highway, road, etc.).

The surface weather characteristic corresponds to the state of the roadway: wet road, ice, snow, dry road, etc.

In a particular embodiment, the surface and surface weather characteristics are combined into a single friction index of the roadway.

The server 107 obtains the characteristics of the road segment 101 by polling, for example, a data base 108, which stores surface types of road segments combined with geographical positions. The server 107 makes requests to the database 108 in order to obtain the characteristics of the roadway at the position of the vehicle. It can also poll a suitable weather service for determining a surface weather characteristic at the location of the vehicle.

During a step 201, the server 107 computes an indicator on the basis of the operating parameters of the vehicle received in step 200. According to a particular embodiment, the computation is carried out on the basis of operating parameters of the vehicle 100 acquired over a particular time window, for example, over a time window of a few seconds corresponding to the start of a particular maneuver. For example, a time window of 1.5 seconds at the start of braking is relevant since it represents a highly dynamic movement of the vehicle.

The indicator comprises at least one mathematical value computed so as to highlight certain dynamic characteristics of the vehicle on the basis of obtained parameters.

Some non-limiting examples of such mathematical values are:

the amplitude of the ratio:

$$\frac{\text{longitudinal acceleration Delta}^3}{\text{moving average of the brake pedal course}}$$

the amplitude of the ratio:

$$\frac{\text{Vehicle Speed}}{\text{moving average of the the brake pedal course}}$$

the minimum of the delta of the speed of the vehicle;
90th percentile:
Speed of Driving Wheels–Speed of non Driving Wheels
maximum:

$$\frac{(\text{Speed of Driving Wheels} - \text{Speed of non Driving Wheels})}{\text{Speed of non Driving Wheels}}$$

media of the ratio:

$$\frac{\text{Speed of Driving Wheels}}{\text{Speed of non Driving Wheels}}$$

maximum of the ratio:

$$\frac{(\text{Speed of Driving Wheels} - \text{Speed of non Driving Wheels})^3}{\text{moving average of the the brake pedal course}}$$

Other types of computation for an indicator can be contemplated.

In step 202, the server 107 determines a frictional category of the vehicle 100 according to the value of the computed indicator and of the at least one obtained characteristic of the road segment. Thus, on the basis of the values of parameters relating to the dynamics of a vehicle on a road with known characteristics, a category is identified for the vehicle, with the category (or group) being associated with a particular frictional behavior of the vehicle for particular road conditions.

Figure 3:
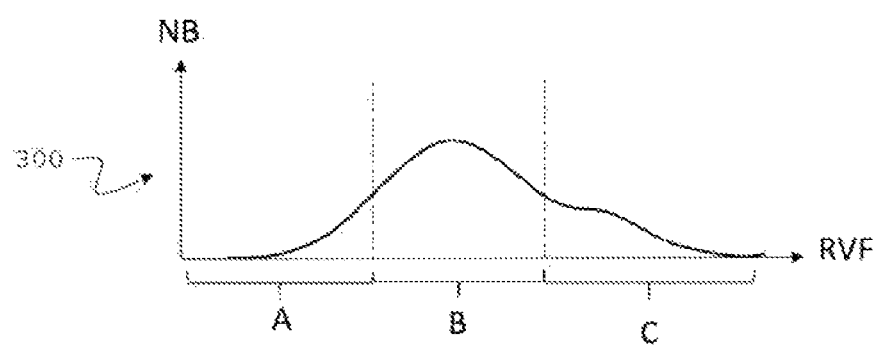
FIG. 3 is a graph illustrating an example of the distribution of the vehicles of a fleet of vehicles according to their frictional behavior for a particular road condition.

FIG. 3 is a graph 300 produced on the basis of data collected by training vehicles on a particular road surface and on a particular weather surface. The graph shows a distribution of training vehicles according to their frictional performance, with the ordinate showing a number (NBV) of training vehicles and the abscissa showing a coefficient of friction (RVF). The graph of FIG. 3 is obtained, for example, on the basis of data collected by the training vehicles when they travel on the road segment 101 of FIG. 1, in road conditions C1.

The curve shown on the graph of FIG. 3 highlights three groups of vehicles A, B and C. In this example, the vehicles of group A have a low coefficient of friction in the road conditions C1 of the segment, whereas the vehicles of groups B and C have a higher coefficient of friction in the same road conditions.

In a particular embodiment, the category of the vehicle 100 is determined from among a set of categories. The set of categories is determined by an unsupervised learning model that is applied, during a prior learning phase, to data collected from a fleet of heterogeneous training vehicles traveling on various segments of the road network in various weather conditions.

The training vehicles are adapted to estimate a coefficient of friction between their tires and the roadway on which they travel. To this end, they can implement, for example, particular sensors and/or algorithms allowing a coefficient of friction to be determined during a particular maneuver.

The training vehicles also have communication means for transmitting the coefficient of friction thus estimated and the geographical position corresponding to the estimate to the server 107. On the basis of the transmitted position, the server 107 consults the database 108 in order to obtain a surface characteristic and a surface weather characteristic of the location at which the friction is estimated.

The server 107 then classifies the data collected by the plurality of training vehicles in various road and weather conditions in an unsupervised manner in order to determine groups, or categories, of training vehicles. For example, the server 107 can apply a mean-shift type algorithm to data transmitted by training vehicles in order to determine categories of vehicle, according to the value of the coefficient of friction estimated for particular road conditions. Each group obtained thus comprises training vehicles exhibiting similar frictional behavior for given surface and weather conditions. In other words, a group is made up of vehicles for which the estimated coefficient of friction is included in the same range of values for a given road segment and weather conditions.

With reference to FIG. 3, the data partitioning algorithm ("clustering") implemented by the server 107 allows, for example, three groups of vehicles to be defined according to the frictional characteristics of the vehicles on the segment 101 in the conditions C1.

In this way, the method allows a finite set of groups to be obtained, with each group corresponding to particular frictional behavior of a vehicle.

In a particular embodiment, the server 107 determines the frictional category of the vehicle 100 by using a learning model that is trained, during a prior learning phase, on the basis of data collected from a fleet of heterogeneous training vehicles traveling on various segments of the road network in various weather conditions.

Figure 4:
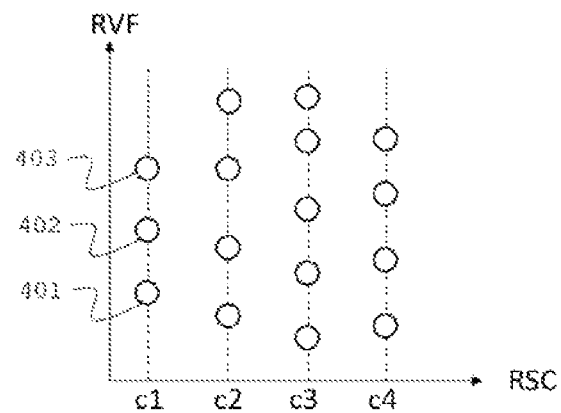
FIG. 4 is a graph showing groups of vehicles obtained by distributing vehicles of a fleet of vehicles according to their coefficient of friction estimated for various road conditions.

FIG. 4 shows a set of categories (or "clusters") of vehicles determined for road conditions C1 to C4 on the basis of the data collected by the training vehicles. In the figure, each cluster is shown by a disk positioned in a coordinate system, the ordinate of which depends on the average coefficient of friction of the vehicles of the cluster and the abscissa of which depends on a characteristic of the road segment.

For example, FIG. 4 shows three categories of vehicles 401 to 403 identified according to the technique described above on the basis of the data collected by training vehicles in road conditions C1.

The method proposes determining the category 401 to 403 to which the vehicle 100 belongs when it travels on the road network in the road conditions C1.

To this end, in a particular embodiment, the server 107 implements a supervised learning model. The model is trained on the basis of data collected by the training vehicles described above, with the data collected by a vehicle at a given instant further comprising operating parameters of the training vehicle.

Its operating parameters are obtained, for example, by a training vehicle from suitable sensors, such as wheel rotation speed sensors, or pressure sensors in a braking system of the vehicle, and are transmitted to the server 107 in a suitable message by means of the access network 105.

In a particular embodiment, the operating parameters captured by the training vehicles are parameters selected from among the following parameters:
 speed of the driving wheels;
 speed of the free wheels;
 longitudinal acceleration;
 transverse acceleration;
 speed of the vehicle;
 torque of the driving wheels;
 pressure in the brake master cylinder;
 depression of the brake pedal;
 etc.

On the basis of these operating parameters of training vehicles, the server 107 computes an indicator according to the method described above, then, for each data item collected at a collection instant by a training vehicle, the server 107 creates a characteristic vector comprising at least:
 the indicator computed on the basis of at least one operating parameter of the training vehicle collected at the collection instant;
 a characteristic of the road surface on which the training vehicle travels; and
 a surface weather characteristic of the road segment on which the training vehicle travels.

Subsequently, the category identified for the training vehicle following the non-supervised classification step is associated with the characteristic vector thus created. In this way, the server 107 obtains learning variables of the supervised learning model, with the learning target of the model being the category to which the vehicle is assigned.

The model is thus trained on the basis of a plurality of characteristic vectors associated with categories of vehicles in order to obtain a model capable of predicting the frictional category of a vehicle on the basis of operating parameters of the vehicle in given conditions. With the group to which a vehicle is assigned being characteristic of the frictional behavior of this vehicle for particular road conditions, the server 107 thus obtains a model capable of predicting the frictional behavior of a vehicle that is not specifically adapted to estimate a coefficient of friction.

Such a supervised learning model, once trained, is applied by the server 107 to the data received from the vehicle 101, in order to determine a characteristic group of its frictional behavior. The server applies the trained learning model to:
 an indicator computed on the basis of at least one operating parameter of the vehicle on the first segment;
 the road surface characteristic of the first segment; and
 the surface weather characteristic of the first segment.

The server thus obtains, as output from the supervised learning model, a category of the vehicle 101 for the road conditions C1, with the category representing the frictional behavior of the vehicle 101 in the conditions C1.

On the basis of the group thus determined for the vehicle 101, the server 107 selects a friction profile of the vehicle during a step 203.

Within the meaning of an aspect of the invention, a friction profile is defined by the set of frictional categories (or groups) to which the vehicle belongs.

Figure 5A:
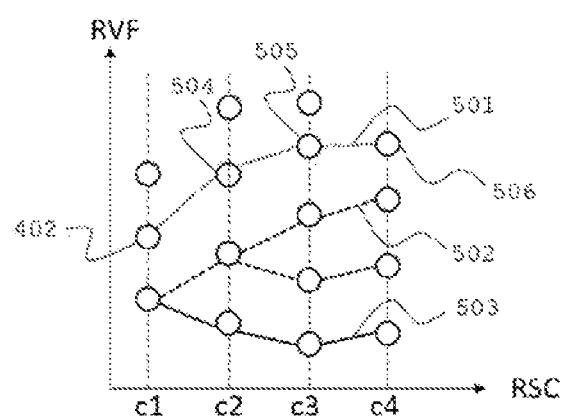
FIG. 5A shows examples of frictional profiles defined on the basis of clusters determined on the basis of data from training vehicles, for various road conditions.

FIG. 5A shows three profiles 501, 502 and 503. Profile 501 is applicable, for example, to vehicles for which the frictional behavior corresponds to the cluster 502 in conditions C1, to the cluster 504 in conditions C2, to the cluster 505 in conditions C3 and to the cluster 506 in road conditions C4.

The various profiles are determined by studying the categories in which the training vehicles are distributed according to the road conditions.

Figure 5B:
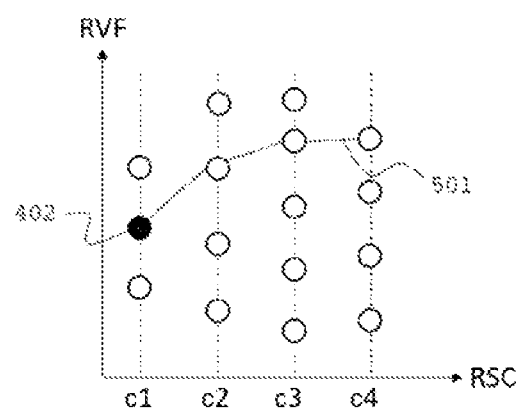
FIG. 5B shows an example of the selection of a friction profile for a vehicle, the frictional category of which is known for road conditions C1.

The profile of the vehicle 100 is selected from among the profiles thus defined, according to the frictional category determined in the road conditions C1. For example, with reference to FIG. 5B, when a vehicle is assigned to the cluster 402 in the road conditions C1, the profile 501 is selected unambiguously.

Figure 5C:
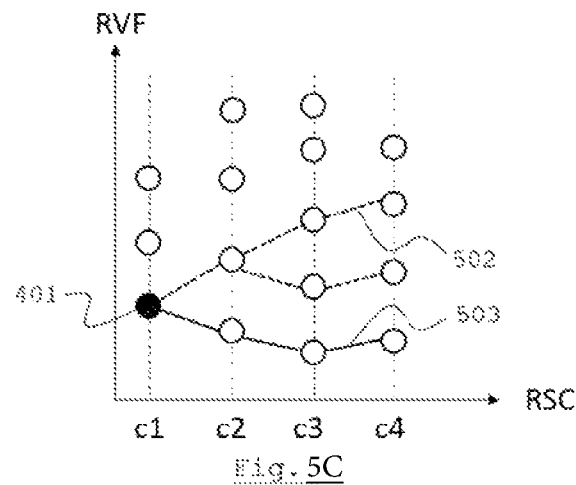
FIG. 5C illustrates an ambiguity that can occur when selecting a vehicle profile when a single frictional category is known for the vehicle.
Figure 5D:
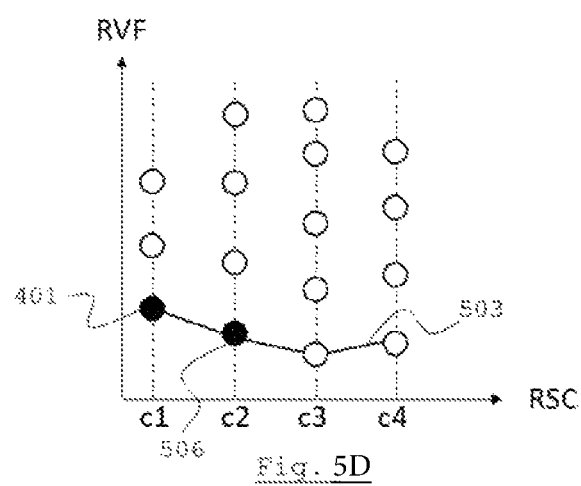
FIG. 5D shows how an ambiguity can be removed when selecting a friction profile when the frictional category of a vehicle is known for at least two road conditions.

However, knowledge of a group to which a vehicle belongs in particular conditions may not suffice for unambiguously selecting a profile. For example, FIG. 5C shows that a vehicle belonging to the cluster 401 in the conditions C2 can have a profile 502 or a profile 503. Indeed, the cluster 401 belongs to the two profiles 502 and 503.

In a particular embodiment, the friction profile is determined on the basis of frictional behavior of the vehicle determined for a plurality of road segments. Thus, for example, with reference to FIG. 5B, knowledge of the clusters 401 and 506 of a vehicle, respectively corresponding to its frictional behavior in road conditions C1 and C2, allows the profile of the vehicle to be unambiguously determined from among the candidate profiles 502 and 503.

During a step 204, the server 107 determines the frictional category of the vehicle for a future road segment.

The server obtains the characteristics of at least one particular road segment for which the frictional behavior of the vehicle 100 must be predicted. For example, it receives a message from the vehicle, in which message the vehicle 100 indicates the segments on which it is likely to travel, such as the segments 102, 103 and 107. As an alternative embodiment, these segments can be determined by the server by executing an algorithm for computing a path on the basis of the position of the vehicle 100. The segments can be identified by one or more geographical locations or by a single segment identifier, on the basis of which the server 107 searches the database 108 and/or a suitable weather service in order to obtain the characteristics C2, C3 and C4 respectively corresponding to the segments 102, 103 and 104.

On the basis of the profile selected in step 203 for the vehicle 100, and of the surface and/or weather characteristics determined for the segments 102 to 104, the server determines the frictional category of the vehicle 100, i.e. the cluster to which the vehicle belongs, for these various segments. For example, with reference to FIG. 5A, when the profile 501 is selected for the vehicle 100, the server 107 can determine that this same vehicle belongs to the cluster 504 for the road conditions C2, to the cluster 505 for the road conditions C3 and to the cluster 506 for the road conditions C4.

In step 205, the server 107 determines a coefficient of friction, or a range of customized coefficient of friction values for each segment 102 to 104. With each cluster being made up of vehicles for which the coefficients of friction are close for particular road conditions, it is possible to associate each cluster with an average value of the coefficients of friction of the vehicles forming said cluster. Thus, on the basis of a cluster representing the frictional category of a vehicle, the server obtains a coefficient of friction value.

In a particular embodiment, the method comprises a step of customizing a digital road map on the basis of friction data adapted for a particular vehicle.

To this end, the method proposes associating a road segment with the coefficient of friction determined for a vehicle on the considered road segment according to the previously described steps. The coefficient of friction can be associated with the map in various ways, for example, in the form of metadata, or by an association between an identifier of the segment and the determined coefficient value.

In a particular embodiment, the server transmits the customized map to the vehicle 100 by means of the access network 105.

Upon receipt of the customized friction map, the vehicle 100 can configure safety devices according to the coefficient of friction determined for a segment that it enters.

Figure 6:
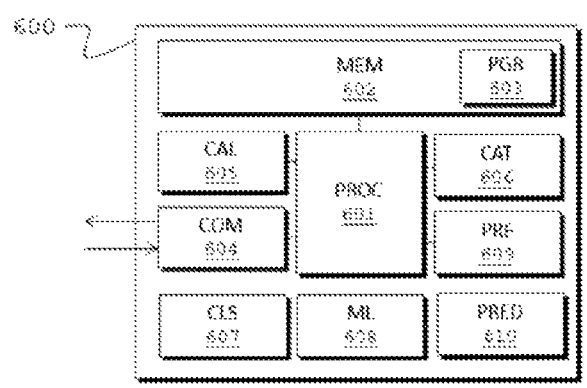
FIG. 6 schematically illustrates a device adapted for implementing the prediction method according to a particular embodiment.

FIG. 6 shows the architecture of a device 600 adapted to implement the prediction method according to a particular embodiment.

The device 600 comprises a storage space 602, for example, a memory MEM, and a processing unit 601 that is equipped, for example, with a processor PROC. The processing unit can be controlled by a program 603, for example, a computer program PGR, implementing the prediction method as previously described with reference to FIG. 2, and in particular the steps of obtaining operating parameters of the vehicle and at least one characteristic of the first road segment, of computing an indicator on the basis of the obtained operating parameters of the vehicle, of determining a frictional category of the vehicle according to the value of the computed indicator and of the at least one obtained characteristic of the road segment, of selecting a friction profile of the vehicle on the basis of the determined frictional category, and of determining a coefficient of friction of the vehicle by applying the selected profile to at least one characteristic of the second road segment.

On initialization, the instructions of the computer program 603 are loaded, for example, into a RAM (Random Access Memory) before being executed by the processor of the processing unit 601. The processor of the processing unit 601 implements the steps of the prediction method according to the instructions of the computer program 603.

To this end, the device 600 comprises, in addition to the memory 602, communication means 604, for example, an Ethernet type COM interface network, allowing the device to connect to a communication network and to exchange messages with other devices, and in particular to receive operating parameters and a location of a connected vehicle. The network interface 604 can be controlled by computer program instructions configured to carry out requests in a database or from a remote weather service in order to obtain, for a given geographical location, road conditions comprising, for example, a type of surface of the roadway and a surface weather. In a particular embodiment, the network interface 604 is also configured to transmit a map or part of a digital road map to a vehicle, to which map customized coefficient of friction values have been associated for the recipient vehicle.

The device also comprises computation means 605, for example, a computer CAL, adapted to compute an indicator representing particular dynamic behavior of a vehicle on the basis of operating parameters of the vehicle. The computation means 605 are implemented by computer program instructions configured to compute an indicator on the basis of operating parameters of a vehicle received by the communication module 604. For example, the instructions are configured to implement, when they are executed by the processor 601, the computation of mathematical values, as described above with reference to step 201 of the prediction method.

The device 600 also comprises a module 606 for determining a frictional category of the vehicle according to the value of the computed indicator and at least one characteristic of a road segment obtained by the communication module 604.

To this end, the module 606 can use an unsupervised classification module 607, for example, a CLS classifier, supplied with data obtained from a fleet of training vehicles, with a data item particularly comprising, for a collection instant, an estimated coefficient of friction, a surface weather condition and a surface characteristic of the road segment on which the training vehicle travels at the collection instant. The CLS classifier is implemented, for example, by computer program instructions adapted to execute a mean-shift type clustering algorithm. In this way, the classifier 607 allows a plurality of frictional categories to be obtained that represent the frictional behavior of the vehicles in particular road conditions.

The module 606 also uses a prediction module 608, for example, a neural network ML, adapted to predict a frictional category of a vehicle for a particular road characteristic. The module 608 is trained with data collected by training vehicles, comprising, for each collection instant, a road surface characteristic, a surface weather characteristic, an indicator computed by the computation module 605 on the basis of operating parameters of the training vehicle, and the frictional category of the training vehicle for said road conditions. In this way, the module trained thus can predict a frictional category of a vehicle on the basis of road conditions and of operating parameters of the vehicle. Such a module can be implemented by computer program instructions adapted to be executed by the processor PROC of the processing unit 601.

The device 600 also comprises means 609 for determining a friction profile for a vehicle. The means 609 are implemented, for example, by a computer program executed by the processor PROC of the processing unit of the device, and configured to select a friction profile from a predefined set of profiles according to at least one frictional category of the vehicle determined by the module 606. To this end, the module 609 can access a database, which stores friction profiles in combination with frictional categories forming said profiles. Thus, the module 609 can carry out a request SQL comprising, as a parameter, one or more frictional categories in order to obtain in return a profile comprising these profiles.

Finally, the device comprises means 610 for determining a coefficient of friction of a vehicle on a second road segment. The means 610 are implemented, for example, by computer program instructions configured to apply the profile selected by the module 609 to at least one characteristic of the second road segment and to determine a frictional category of the vehicle on the second road segment. On the basis of the frictional category thus determined, the instructions are also configured to obtain an average friction value associated with the frictional category.

According to a particular embodiment, the device further comprises a module for customizing a digital road map. The customization module is implemented, for example, by computer program instructions stored in the memory 602 of the device and configured so that, when they are executed by the processor PROC, a coefficient of friction, predicted for a road segment that a vehicle is likely to enter, is associated with a representation of the segment on the road map.

In a particular embodiment, the device is included in a server.

The invention claimed is:

1. A method for predicting, for a motor vehicle having at least one vehicle safety system and traveling on a first road segment, a future coefficient of friction of the vehicle on a second road segment, the method comprising:
    obtaining operating parameters of the vehicle and at least one characteristic of the first road segment;
    computing an indicator on the basis of the obtained operating parameters of the vehicle;
    determining a frictional category of the vehicle according to the value of the computed indicator and of the at least one obtained characteristic of the road segment;
    selecting a friction profile of the vehicle on the basis of the determined frictional category;
    determining a coefficient of friction of the vehicle by applying the selected friction profile to at least one characteristic of the second road segment; and
    using the coefficient of friction of the vehicle for configuration of the at least one vehicle safety system,
wherein at least one characteristic of the first and second road segments comprises, for a considered segment:
    a surface characteristic of the roadway; and
    a surface weather characteristic.

2. The method as claimed in claim 1, wherein the indicator is computed on the basis of at least one operating parameter of the vehicle selected from the following parameters:
    speed of the driving wheels;
    speed of the free wheels;
    longitudinal acceleration;
    transverse acceleration;
    speed of the vehicle;
    torque of the driving wheels;
    pressure in the brake master cylinder;
    depression of the brake pedal.

3. The method as claimed in claim 2, wherein the friction profile is selected from a set of frictional profiles, with the set of frictional profiles being determined according to the following:
    collecting, for a plurality of collection instants, training vehicle data, with a training vehicle data item comprising at least, for a given instant:
        a road surface characteristic;
        a surface weather characteristic; and
        a coefficient of friction estimated by the vehicle;
    determining a plurality of frictional categories of vehicles by unsupervised classification of the collected data, so that a particular frictional category comprises vehicles with a coefficient of friction within the same range of values for a given surface characteristic and weather characteristic; and
    determining at least one vehicle friction profile, with a friction profile being defined by a set of frictional categories to which a particular vehicle is assigned.

4. The method as claimed in claim 1, wherein the friction profile is selected from a set of frictional profiles, with the set of frictional profiles being determined according to the following:
    collecting, for a plurality of collection instants, training vehicle data, with a training vehicle data item comprising at least, for a given instant:
        a road surface characteristic;
        a surface weather characteristic; and
        a coefficient of friction estimated by the vehicle;
    determining a plurality of frictional categories of vehicles by unsupervised classification of the collected data, so that a particular frictional category comprises vehicles with a coefficient of friction within the same range of values for a given surface characteristic and weather characteristic; and determining at least one vehicle friction profile, with a friction profile being defined by a set of frictional categories to which a particular vehicle is assigned.

5. The method as claimed in claim 4, wherein selecting the friction profile of the vehicle comprises:
a phase of training a learning model comprising:
creating, for a data item collected by a training vehicle at a collection instant, a characteristic vector comprising at least:
an indicator computed on the basis of at least one operating parameter of the training vehicle collected at the collection instant;
the road surface characteristic; and
the surface weather characteristic;
training a learning model on the basis of the characteristic vector associated with the frictional category of the vehicle determined for the collected data; and
a prediction phase, during which:
a frictional category of a vehicle traveling on the first segment is predicted by applying the learning model to:
an indicator computed on the basis of at least one operating parameter of the vehicle on the first segment;
the road surface characteristic of the first segment; and
the surface weather characteristic of the first segment; and
a friction profile is selected at least on the basis of the frictional category predicted for the vehicle on the first segment.

6. The method as claimed in claim 1, wherein the friction profile is determined on the basis of at least two frictional categories of the vehicle determined for at least two first road segments.

7. The method as claimed in claim 1, wherein the indicator comprises at least one mathematical value that highlights specific dynamic characteristics of the vehicle based on the obtained operating parameters of the vehicle.

8. The method as claimed in claim 1, wherein the at least one vehicle safety system includes at least one of an Antilock Braking System ("ABS"), an Electronic Stability Program ("ESP"), or a Traction Control System ("TCS").

9. A device for predicting, for a motor vehicle having at least one vehicle safety system and traveling on a first road segment, a future coefficient of friction between the tires of the vehicle and the roadway of a second road segment, the device comprising:
a communication module adapted to obtain operating parameters of the vehicle and at least one characteristic of the first road segment;
a computer adapted to compute an indicator on the basis of the obtained operating parameters of the vehicle;
a module for determining a frictional category of the vehicle according to the value of the computed indicator and of the at least one obtained characteristic of the road segment;
a module for selecting a friction profile of the vehicle on the basis of the determined frictional category;
a module for determining a coefficient of friction of the vehicle by applying the selected friction profile to at least one characteristic of the second road segment,
wherein the at least one characteristic of the first and second road segments comprises, for a considered segment:
a surface characteristic of the roadway; and
a surface weather characteristic; and
wherein the coefficient of friction of the vehicle is used for configuration of the at least one vehicle safety system.

10. A server comprising a device as claimed in claim 9.

11. The device as claimed in claim 9, wherein the at least one vehicle safety system includes at least one of an Antilock Braking System ("ABS"), an Electronic Stability Program ("ESP"), or a Traction Control System ("TCS").

* * * * *